United States Patent
Chen et al.

(10) Patent No.: US 8,179,961 B2
(45) Date of Patent: May 15, 2012

(54) METHOD AND APPARATUS FOR ADAPTING A DEFAULT ENCODING OF A DIGITAL VIDEO SIGNAL DURING A SCENE CHANGE PERIOD

(75) Inventors: Zhi Bo Chen, Beijing (CN); Xiao Dong Gu, Beijing (CN); Li Hua Zhu, Beijing (CN); Qu Qing Chen, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 714 days.

(21) Appl. No.: 12/309,336

(22) PCT Filed: Jul. 17, 2006

(86) PCT No.: PCT/CN2006/001700
§ 371 (c)(1),
(2), (4) Date: Jan. 14, 2009

(87) PCT Pub. No.: WO2008/019525
PCT Pub. Date: Feb. 21, 2008

(65) Prior Publication Data
US 2009/0175330 A1    Jul. 9, 2009

(51) Int. Cl.
*H04N 7/26* (2006.01)
*H04N 11/04* (2006.01)

(52) U.S. Cl. ........ 375/240.01; 375/240.24; 375/E7.088; 348/700

(58) Field of Classification Search ............. 375/240.01, 375/E7.088, 240.24; 348/700
See application file for complete search history.

(56) References Cited

U.S. PATENT DOCUMENTS

| | | | |
|---|---|---|---|
| 5,532,746 A * | 7/1996 | Chang | 375/240.12 |
| 5,592,226 A * | 1/1997 | Lee et al. | 375/240.14 |
| 6,057,893 A * | 5/2000 | Kojima et al. | 348/700 |

(Continued)

FOREIGN PATENT DOCUMENTS

CN    1447285    10/2003

(Continued)

OTHER PUBLICATIONS

Search Report Dated Mar. 19, 2007.

(Continued)

*Primary Examiner* — Kwang B Yao
*Assistant Examiner* — Candal Elpenord
(74) *Attorney, Agent, or Firm* — Myers Wolin, LLC

(57) ABSTRACT

The frame following a scene cut is usually coded as an I picture. In CBR encoding, the encoder will try to keep the bit rate constant, which will often cause serious picture quality degradation at scene changes. In VBR encoding, more bits will be allocated to the first frame of the new scene and the bit rate will increase significantly for a short time. Therefore subsequent frames must be coded in 'skipped' mode, which will often cause jerk artifacts. According to the invention, in each frame belonging to a scene change period, areas are determined that have different human attention levels. In the frames (n−1, n−2, n−3) located prior to the first new scene frame, to the areas having a lower attention level less bits are assigned than in the default encoding, and in the frames (n, n+1, n+2) located at and after the scene cut the thus saved bits are additionally assigned to the areas having a higher attention level.

11 Claims, 3 Drawing Sheets

U.S. PATENT DOCUMENTS

Figure 3:
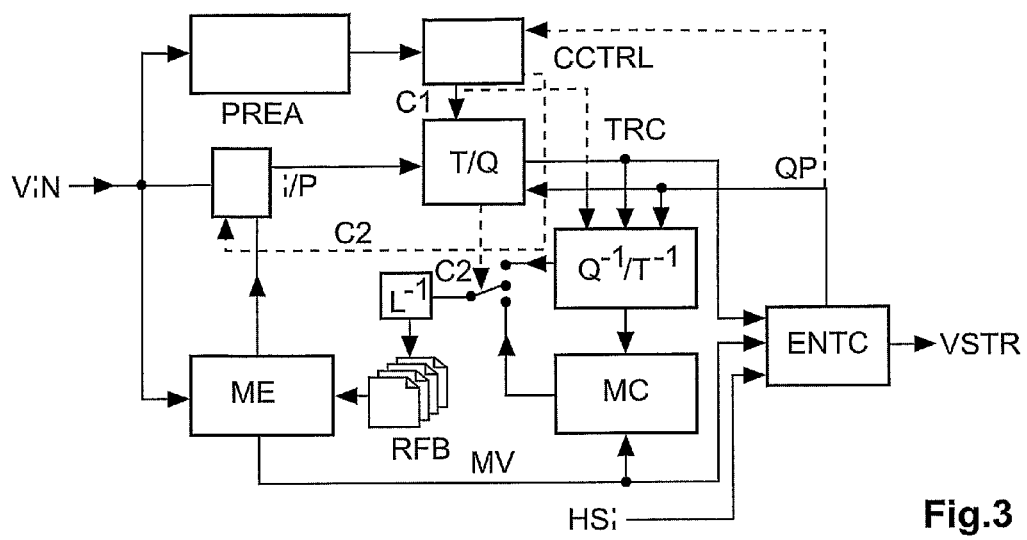

| | | | | |
|---|---|---|---|---|
| 7,308,146 | B2* | 12/2007 | Becker et al. | 382/233 |
| 7,529,298 | B2* | 5/2009 | Yasuda | 375/240.01 |
| 7,826,531 | B2* | 11/2010 | Wang et al. | 375/240.1 |
| 8,019,175 | B2* | 9/2011 | Lee et al. | 382/282 |
| 2003/0202581 | A1* | 10/2003 | Kodama | 375/240.03 |
| 2005/0286629 | A1* | 12/2005 | Dumitras et al. | 375/240.03 |
| 2006/0204113 | A1* | 9/2006 | Wang et al. | 382/236 |
| 2006/0215753 | A1* | 9/2006 | Lee et al. | 375/240.08 |

FOREIGN PATENT DOCUMENTS

| | | |
|---|---|---|
| CN | 1764277 A | 4/2006 |
| EP | 1294198 | 3/2003 |
| EP | 1349394 | 10/2003 |
| WO | WO0046999 | 8/2000 |

OTHER PUBLICATIONS

Breitmeyer B G et al., Recent models and findings in visual backwards masking: A comparison, review and update, Perception and Psyphysics, Psychonomic Society, Austin, Texas, US, vol. 62, No. 8, Jan. 1, 2000, pp. 1572-1595.

Chen JJ et al., Optimal bit allocation for coding of video signals over ATM networks, IEEE Journal on selected areas in communications, vol. 15, No. 6, Aug. 1, 1997, Piscataway, US, pp. 1002-1015.

Jungwo Lee et al., Subband video coding with scene-adaptive hierarchical motion estimation, IEEE tranactions on circuits and systems for video technology, IEEE service center, Piscataway, NJ, US, vol. 9, No. 3, Apr. 1, 1999, pp. 459-466.

Keesman G et al., Study of the subjective performance of a range of MPEG-2 encoders, Broadcasting convention, 1995, IBS 95, International, Amsterdam, Netherlands, London, UK, Jan. 1, 1995, pp. 232-237.

Osberger W et al., An MPEG encoder incorporating perceptually based quantisation, Tencon 97, IEEE region 10 annual conference, Speech and image technologies for c omputing and telecommunications, Proceedings of IEEE, Brisbane, Australia Dec. 2-4, 1997, New York, NY, pp. 731-734.

Zhi Bo Chen et al., Improving video coding at scene cuts using attantion based adaptive bit allocation, Circuits and Systems, 2007, ISCAS 2007, IEEE Internatinonal Symposium, O N, IEEE, PI, May 1, 2007, pp. 3634-3638.

European Search Report dated Jul. 1, 2009.

* cited by examiner

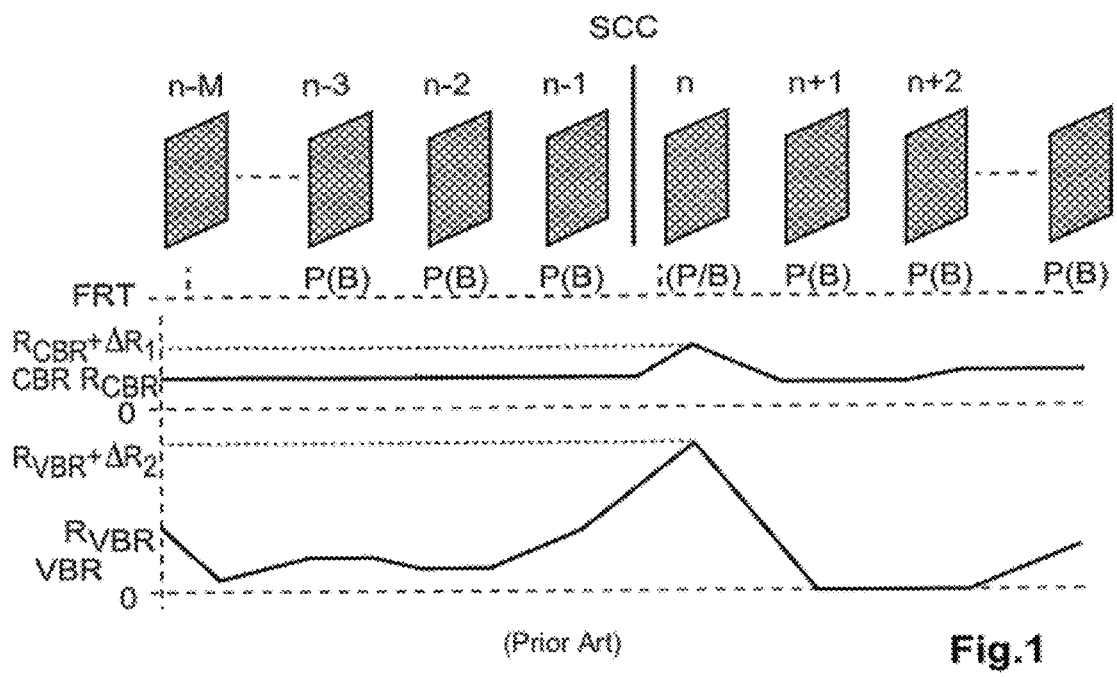
(Prior Art) Fig.1
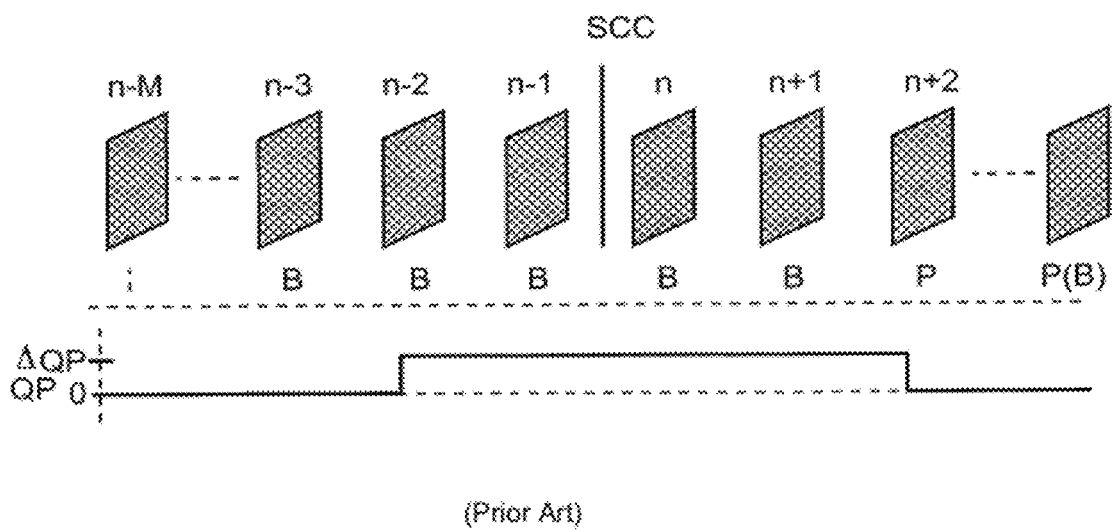
(Prior Art) Fig.2

■ M1 ▨ M2 ▦ M3 ☐ M4

METHOD AND APPARATUS FOR ADAPTING A DEFAULT ENCODING OF A DIGITAL VIDEO SIGNAL DURING A SCENE CHANGE PERIOD

This application claims the benefit, under 35 U.S.C. §365 of International Application PCT/CN2006/001700, filed Jul. 17, 2006, which was published in accordance with PCT Article 21(2) on Feb. 21, 2008.

The invention relates to a method and to an apparatus for adapting a default encoding of a digital video signal during a scene change period.

BACKGROUND

Hybrid video coding techniques have been widely adopted in video coding standards like H.263, MPEG-2 and H.264/MPEG-4 AVC. Intensive work has been carried out on improving the visual quality within a given bit rate constraint, using the existing coding tools. Generally CBR (constant bit rate control) and VBR (variable bit rate control) are used to meet the trade-off between quality and rate constraint for different applications. In CBR mode, the number of bits that can be transmitted to a video decoder in a given time interval is typically fixed. The decoder side will also use a buffer of specified size referred to as the video buffer verifier (VBV) in MPEG2 and MPEG4-2 or as Hypothetical Reference Decoder (HRD) in H.263 and MPEG4-AVC/H.264. Related applications are e.g. TV broadcast, cable transmission, and wireless communication of compressed video. In VBR mode, the total number of bit used to compress a long sequence of video is typically fixed, while limits on instantaneous bit rate are practically non-existent. Related applications are stored media applications like DVD (Digital Versatile Discs) and PVR (Personal Video Recorder).

Due to the high variability in the picture content present in many video sources, a long video sequence can be divided into consecutive video shots. A video shot may be defined as a sequence of frames captured by "a single camera in a single continuous action in time and space". Usually it is a group of frames that have consistent visual characters (including colour, texture, motion, etc.). Therefore a large number of different types of scene changes or scene cuts can exist between such shots. A scene cut is an abrupt transition between two adjacent frames. Electronic scene cut detection as such is known. A common method is to use histograms for comparing consecutive video frames H. J. Zhang, A. Kankanhalli and S. W. Smoliar, "Automatic partitioning of full-motion video", Multimedia Systems, volume 1, pages 10-28, 1993, Springer Verlag. In Z. Cernekova, I. Pitas, Ch. Nikou, "Information Theory-Based Shot Cut/Fade Detection and Video Summarization", IEEE CSVT, pages 82-91, 2006, a Mutual Information (MI) is used for detecting scene cuts.

FIG. 1 shows that the picture 'n' following a scene cut SCC is usually coded as an intra frame picture I, and different bit allocation schemes will be adopted in CBR and VBR processing. In case of CBR, the encoder will try to keep the bit rate $R_{CBR}$ constant, as FIG. 1 illustrates, which will often cause serious picture quality degradation at scene changes. In case of VBR, more bits will be allocated to frame 'n' and the bit rate $R_{VBR}$ will increase significantly for a short time. Usually, subsequent frames will be coded in 'skipped' mode according to buffer constraint or transmission rate constraint, i.e. $R_{VBR}$ will be nearly zero as FIG. 1 illustrates in order to soon return to the average bit rate for the video sequence, which will often cause jerk artefacts in the video display. If an encoder does not handle a scene change well, the encoder will usually consider the picture following the scene cut (i.e. the first picture of the new scene) as a picture similar to the previous one and therefore allocate bits accordingly. If this picture is coded as a P or B frame, the picture quality will be seriously deteriorated due to less allocated bits.

Also, in most rate control algorithms the parameters from coding previous pictures are usually used as candidate parameters for coding future pictures, which is not appropriate when a scene change occurs. This also results in a quality break and the more accurate the bit rate control is, the more severe the problem is.

US-A-2005/0286629 proposes a method for scene cut coding using non-reference frames, wherein the scene cut frame and its neighbouring frames (before and after) are coded as non-reference frames (B frame type, as shown in FIG. 2) with increased quantisation parameters QP (i.e. with coarser quantisation) in order to reduce the bandwidth. But in this case, the coding efficiency of the first P frame following the scene cut is very low due to the long prediction distance, and a longer picture delay is required. A better performance in the B frame coding and a good trade-off between quality and rate constraint can not be assured.

INVENTION

Therefore, prior art scene change processing does not provide a good trade-off between resulting picture quality and buffer capacity constraint.

A problem to be solved by the invention is to provide increased picture coding/decoding quality and improved bit rate control for the pictures located near scene changes. This problem is solved by the method disclosed in claim 1. An apparatus that utilises this method is disclosed in claim 2.

Based on the theory of 'change blindness', according to which theory picture content change blindness is evident when picture errors occur far from the viewer's focus of attention (cf. D. T. Levin, "Change blindness," Trends in Cognitive Science, 1997, vol. 1, no. 7, pp. 261-267, and D. J. Simons and Ch. F. Chabris, "Gorillas in our midst: sustained inattentional blindness for dynamic events," Perception, 1999, vol. 7, pp. 1059-1074, or D. J. Simons), a novel processing with optimum perceptual video coding based on attention area extraction is used in this invention, which processing smoothes the output of the video encoding/de-coding at scene changes without causing serious reduction of the subjective video quality.

Based on such information from attention area extraction and the effects of temporal masking and change blindness, a perceptual bit allocation scheme for scene changes is disclosed. Following video input and attention area extraction, scene change period detection is performed in a pre-analysis step. Based on the information from the attention area or areas, optimised bit allocation is performed, thereby achieving a much better subjective picture quality under buffer size constraint, and a significantly better trade-off between spatial/temporal quality assurance and buffer size constraint.

Advantageously, the invention can also be applied in case of special scene changes like fade in/out or dissolve. The invention can be combined with different bit rate control schemes.

In principle, the inventive method is suited for adapting a default encoding of a digital video signal during a scene change period, which period includes at least one picture prior to the first picture of the new scene and at least one picture following said first picture of the new scene, wherein these pictures and/or macro pixel blocks or pixel blocks of these pictures can be encoded in a predicted or in a non-predicted mode and wherein to quantised coefficients a number of bits are assigned for the further encoding processing, said method including the steps:

determining a scene cut and the corresponding scene change period;
  in each picture belonging to said scene change period, determining areas having at least two different human attention levels;
  assigning in the picture or pictures located prior to said first new scene picture to the areas having an attention level corresponding to lower attention less bits than in said default encoding and assigning in the pictures located at and after said scene cut the thus saved bits additionally to the areas having an attention level corresponding to higher attention.

In principle the inventive apparatus is suited for adapting a default encoding of a digital video signal during a scene change period, which period includes at least one picture prior to the first picture of the new scene and at least one picture following said first picture of the new scene, wherein these pictures and/or macro pixel blocks or pixel blocks of these pictures can be encoded in a predicted or in a non-predicted mode and wherein to quantised coefficients a number of bits are assigned for the further encoding processing, said apparatus including:

means being adapted for determining a scene cut and the corresponding scene change period and for determining, in each picture belonging to said scene change period, areas having at least two different human attention levels;
  means being adapted for assigning in the picture or pictures located prior to said first new scene picture to the areas having an attention level corresponding to lower attention less bits than in said default encoding and for assigning in the pictures located at and after said scene cut the thus saved bits additionally to the areas having an attention level corresponding to higher attention.

Advantageous additional embodiments of the invention are disclosed in the respective dependent claims.

DRAWINGS

Figure 4:
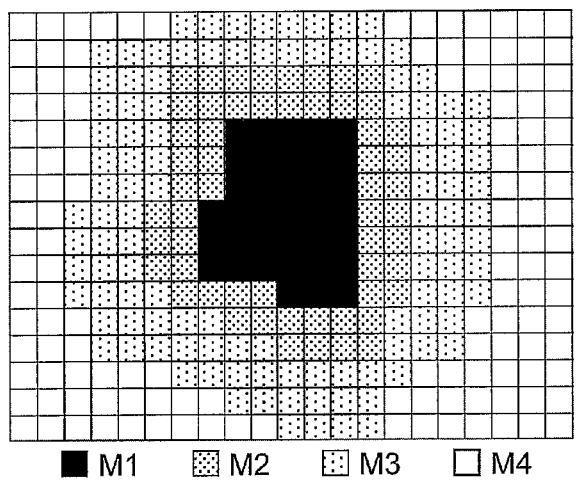
Figure 5:
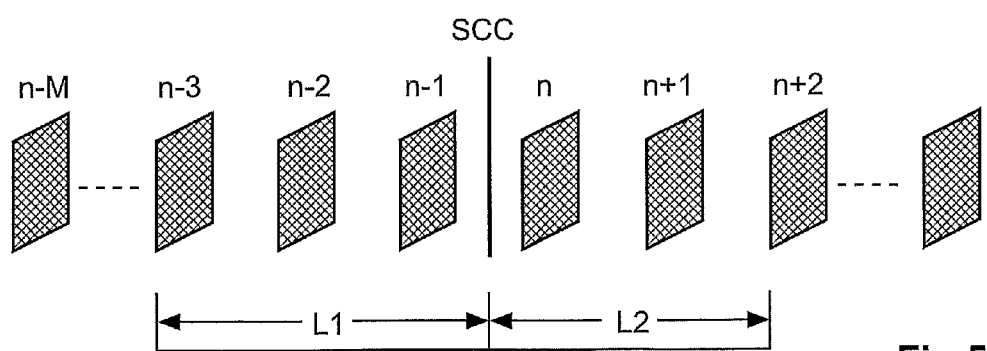
Figure 6:
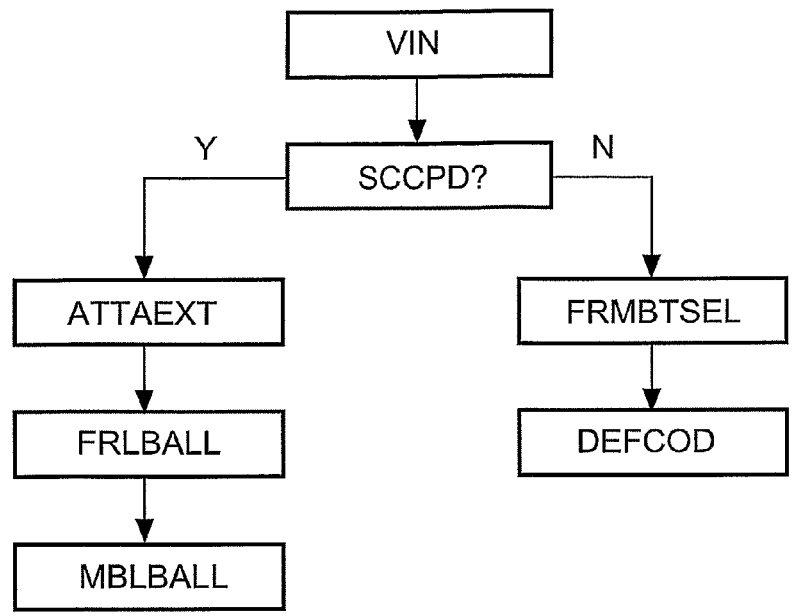
Figure 7:
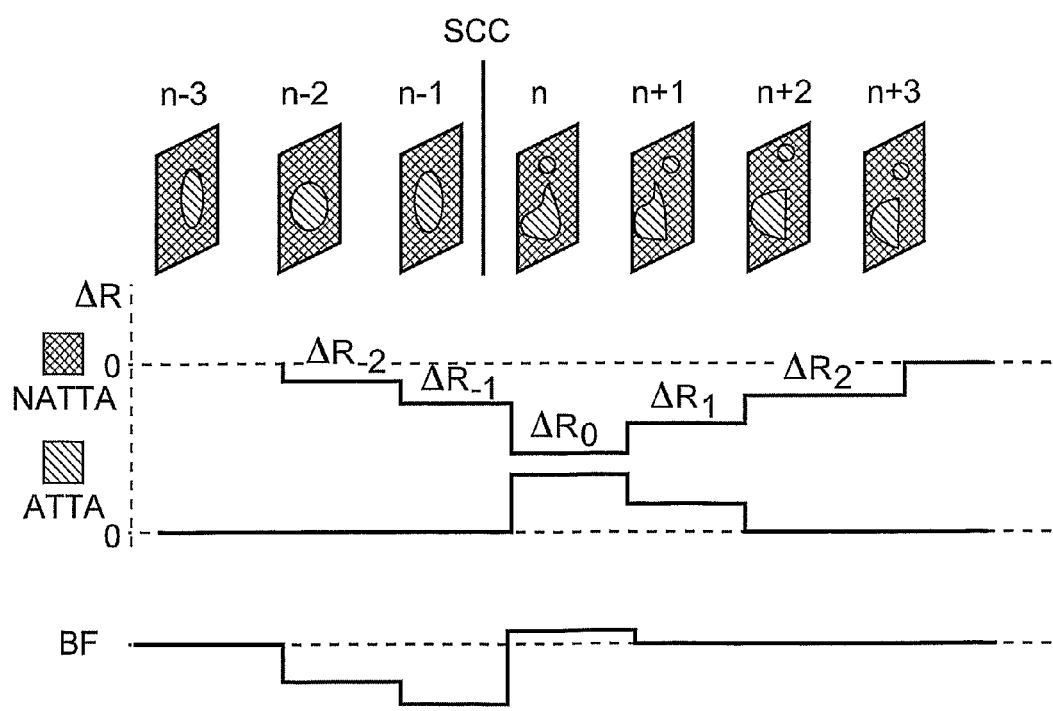

Exemplary embodiments of the invention are described with reference to the accompanying drawings, which show in:

FIG. 1 typical bit rate characteristic at scene change in the CBR and VBR cases;
FIG. 2 known quantisation parameter control at scene change;
FIG. 3 block diagram of the inventive encoder;
FIG. 4 example attention mask;
FIG. 5 illustration of frames the encoding of which is affected at scene changes;
FIG. 6 flowchart of the inventive processing;
FIG. 7 example perceptual bit allocation for encoding an attention area and a non-attention area at a scene change in the CBR case, and corresponding buffer fullness level.

EXEMPLARY EMBODIMENTS

FIG. 4 shows an example attention mask for a picture, which attention mask divides the macro-blocks of the picture into e.g. four levels of attention importance. These levels $M_i$ (i=1 . . . 4) represent the visual importance of each corresponding set of macroblocks, wherein a larger $M_i$ means that a larger coding/decoding distortion can be tolerated because it is a visually less important area. The process of determining the $M_i$ levels and the corresponding macroblock areas is described in L. Itti, Ch. Koch and E. Niebur, "A Model of Saliency-Based Visual Attention for Rapid Scene Analysis", IEEE Transactions on Pattern Analysis and Machine Intelligence, Vol. 20, No. 11, November 1998, in application EP05300974.2 and in B. Breitmeyer, H. Ogmen, "Recent models and findings in visual backward masking: A comparison, review and update", Perception & Psychophysics, 2000, 62(8), pp. 1572-1595.

FIG. 5 shows a 'scene change period' which represents a period of frames located close to (before and after) a scene cut. The corresponding window size L1+L2 for the scene change period is determined by temporal forward and backward masking effects described in US-A-2005/0286629 and in the above article from Breitmeyer et al.

Usually, L1=(1 . . . 4) and L2=(2 or 3), for example L1=2 and L2=3 were used in simulations. The scene change period detection can be performed using the same method as for scene cut detection.

FIG. 3 shows a block diagram of a known hybrid encoder to which two additional functions or blocks are attached. A video input signal VIN is fed to an intra/inter switching block or stage I/P, to a motion estimator ME and to a pre-analysis block or stage PREA. The output signal from stage I/P passes through a transform/quantisation block or stage T/Q to a corresponding inverse transform/inverse quantisation block or stage $T^{-1}/Q^{-1}$ and to an entropy encoding block or stage ENTC which includes a buffer and e.g. Huffman encodes the transform coefficients TRC. The fullness of this buffer may control via a quantisation parameter QP the quantiser step size in T/Q and $T^{-1}/Q^{-1}$. For non-predicted frames or macroblocks or blocks, the output of stage $T^{-1}/Q^{-1}$ passes through a one-frame delay $L^{-1}$ and a set of frame buffers RFB to a second input of motion estimator ME. For predicted frames or macroblocks or blocks, the output of stage $T^{-1}/Q^{-1}$ passes through a motion compensator MC and delay $L^{-1}$ and frame buffers RFB to the second input of motion estimator ME. ME calculates macroblock or block motion vectors MV which are used in MC and also passed to entropy encoding stage ENTC that outputs the encoded video bitstream VSTR. VSTR also includes header and side information HSI. For non-predicted frames or macroblocks or blocks, stage I/P passes signal VIN to stage T/Q. For predicted frames or macroblocks or blocks, the motion compensated macroblocks or blocks from motion estimator ME are subtracted in stage I/P from signal VIN and the difference signal only is fed to stage T/Q. The pre-analysis block or stage PREA determines scene cut frame positions and multi-level (at least two) attention areas in the corresponding adjacent frames. Based on the information items from stage PREA, a coder control block or stage CCTRL sends first control information C1 to stages T/Q and $T^{-1}/Q^{-1}$ to control or adapt the quantisation of each macroblock or block, and sends second control information C2 to stage I/P for selecting the suitable mode (I, P, B) for each frame and/or the suitable mode (I, P, B) for each macroblock or block in the scene change period L1+L2. Stage CCTRL may also receive the current candidate quantisation parameter QP from stage ENTC in order to adapt it to the scene change encoding.

For detecting scene cuts, stage PREA may use the processing disclosed in the above-mentioned articles from Zhang et al. and Cerhekova et al.

For detecting attention areas and attention levels, stage PREA may use the processing disclosed in the above-mentioned article from Itti et al. and in EP05300974.2. Humans always pay more attention to some part of the picture rather than to other parts. The 'attention area' is the perceptual sensitive area in a picture which catches more attention from a human.

Basically, as described in the above Itti et al. article, an attention map or saliency map is calculated by determining e.g. colour contrast, luminance contrast and object or border orientation contrast maps of a picture, followed by calculating centre-surround differences, normalisation and linear combination. In other known attention calculation methods, first a set of feature maps in grey level is extracted from the visual input of a given image. These features include luminance intensity, colour, orientation, and so on.

Thereafter in each feature map the most salient areas are picked out. Finally all feature maps are integrated, in a purely bottom-up manner, into a master 'saliency map', which is regarded as the attention information of a picture. Therefrom the attention mask is obtained for each picture, describing the different attention importance levels of different areas of a picture.

In the inventive processing depicted in FIG. 6, the video input signal VIN is checked in step SCCPD for scene cuts or changes and for the corresponding period. If the result of this check is 'no', the frame type and the macroblock or block type are determined in step FRMBTSEL according to default schemes (using any existing rate control and switching processing), followed by a known default encoding DEFCOD. If the result of check SCCPD is 'yes', the attention areas and levels of the corresponding frames are extracted in step ATTAEXT based on the above-mentioned processing. Based on the determined attention areas and levels, in step FRLBALL a corresponding bit allocation is carried out for corresponding frames. This frame level bit allocation adjustment is only applied to the frames belonging to the scene cut period L1+L2. Thereafter an attention based macroblock or block level bit allocation is made in these frames in step MBLBALL, based on the attention areas in the frames.

In FIG. 7 the area marked by diagonal lines is an attention area and the area marked by cross lines is a non-attention area. When a scene cut happens, the attention area has the highest priority to be allocated with more bits in order to keep a high subjective picture quality within the attention area, while the non-attention area has a lower priority to be allocated bits.

E.g. for the frames n−2 and n−1 located prior to the scene cut, bits are removed from the non-attention area to free buffer occupancy, which introduces negligible degradation on subjective quality due to the effect of temporal backward masking. E.g. for the frames n, n+1, n+2 and n+3 of the new scene, bits can also be removed from the non-attention area to free buffer occupancy, which introduces neglectable degradation on subjective quality due to the effect of temporal forward masking.

In other words, $\Delta R_i$ is removed from the non-attention area in the i-th frame inside the scene cut period ($-L1 \leq i \leq L2$), wherein i=0 represents the scene cut frame and i<0 represents the frames prior to the scene cut) as defined in the following equation:

$$\Delta R_i = \left(\frac{K_i \rho}{1 - \rho + K_i \rho} - \rho\right) R_{F_i},$$

wherein i is the running frame, $\rho$ is the proportion of the attention area or areas inside the whole frame, $R_{F_i}$ is the total bit rate for frame i, and $K_i$ is a control factor ($K_i > 1$) that leads to a better trade-off between attention area picture quality and non-attention area picture quality and that can also be changed adaptively in practical applications. The size of $K_i$ depends on the relative complexity between the attention area or areas and the non-attention area or areas. E.g., if an attention area has a much higher complexity $K_i$ will be larger.

For the frames i<0, the removed bits from the non-attention area are saved to free buffer occupancy while for the frames i≧0 the removed bits are re-allocated to the attention area to improve the perceptual video quality. The adjustment of the bit allocation for different parts of the frames inside the scene cut period efficiently improves the subjective picture quality under the same total bit allocation for these frames, as well as efficiently reduce the buffer occupancy before the scene cut and reduce the probability of buffer overflow after the scene cut.

Coding skipped frames can be reduced by putting limited resources to lower-attention areas and thereby reducing necessary bits for encoding scene cut frames. This improves decoder synchronisation and removes jerk artefacts. Due to the change blindness property of the human visual system, a better trade-off between spatial/temporal picture quality assurance and buffer rate constraint can be achieved.

The inventive processing can also be based on fields instead of frames, i.e. in a more general manner the invention applied on pictures of a digital video signal.

The invention is compatible with other rate control schemes and suitable for any existing video coding standards like MPEG-2 Video, MPEG-4 AVC/H.264, H.263, etc.

The invention claimed is:

1. A method for adapting a default encoding of a digital video signal during a scene change period, which period includes at least one picture prior to the first picture of the new scene and at least one picture following said first picture of the new scene, wherein these pictures or macro pixel blocks or pixel blocks of these pictures are encoded in a predicted or in a non-predicted mode and wherein to quantized coefficients a number of bits are assigned for the further encoding processing, said method comprising:
   determining a scene cut and the corresponding scene change period;
   in each picture belonging to said scene change period, determining areas having at least two different human attention levels;
   assigning in pictures located prior to and at and after said scene cut to the areas having an attention level corresponding to lower attention less bits than in said default encoding, and assigning in the pictures located at and after said scene cut available bits saved in this way additionally to the areas having an attention level corresponding to higher attention,
   wherein said assigning of less bits to lower the attention areas is increased picture by picture until said first picture of the new scene, and is decreased picture by picture in the pictures following said first picture of the new scene, and wherein said assigning of more bits to the higher attention areas is decreased picture by picture starting from said first picture of the new scene.

2. The method according to claim 1, wherein said scene change period includes one, two, three or four pictures prior to the first picture of the new scene and one or two pictures following said first picture of the new scene.

3. The method according to claim 1, wherein said assigning also includes assigning a suitable encoding mode to each frame and/or to each macroblock or block.

4. The method according to claim 1, wherein said assigning of bits is also performed at picture level.

5. The method according to claim 1, wherein said bit rate is decreased in said lower attention areas in the i-th picture by $$\Delta R_i = \left(\frac{K_i \rho}{1 - \rho + K_i \rho} - \rho\right) R_{F_i},$$

wherein i is the running picture inside said scene cut period and i=0 represents said first picture of the new scene and i<0 represents the pictures prior to said first picture, ρ is the proportion of the attention area or areas inside a whole picture, $R_{F_i}$ is the total bit rate for frame i, and $K_i$ is a control factor greater '1' that leads to a better trade-off between higher attention area picture quality and lower attention area picture quality.

6. An apparatus for adapting a default encoding of a digital video signal during a scene change period, which period includes at least one picture prior to the first picture of the new scene and at least one picture following said first picture of the new scene, wherein these pictures or macro pixel blocks or pixel blocks of these pictures are encoded in a predicted or in a non-predicted mode and wherein to quantized coefficients a number of bits are assigned for the further encoding processing, said apparatus comprising:
- a pre-analysis module for determining a scene cut and the corresponding scene change period, and for determining, in each picture belonging to said scene change period, areas having at least two different human attention levels;
- a coder control module for assigning in pictures located prior to and at and after said first new scene picture to the areas having an attention level corresponding to lower attention less bits than in said default encoding and for assigning in the pictures located at and after said scene cut available bits saved in this way additionally to the areas having an attention level corresponding to higher attention,
- wherein said assigning of less bits to lower the attention areas is increased picture by picture until said first picture of the new scene, and is decreased picture by picture in the pictures following said first picture of the new scene, and wherein said assigning of more bits to the higher attention areas is decreased picture by picture starting from said first picture of the new scene.

7. The apparatus according to claim 6, wherein said scene change period includes one, two, three or four pictures prior to the first picture of the new scene and one or two pictures following said first picture of the new scene.

8. The apparatus according to claim 6, wherein said coder control module also assigns a suitable encoding mode to each frame and/or to each macroblock or block.

9. The apparatus according to claim 6, wherein said assigning of bits is also performed at picture level.

10. The apparatus according to claim 6, wherein said bit rate is decreased in said lower attention areas in the i-th picture by $$\Delta R_i = \left(\frac{K_i \rho}{1 - \rho + K_i \rho} - \rho\right) R_{F_i},$$

wherein i is the running picture inside said scene cut period and i=0 represents said first picture of the new scene and i<0 represents the pictures prior to said first picture, ρ is the proportion of the attention area or areas inside a whole picture, $R_{F_i}$ is the total bit rate for frame i, and $K_i$ is a control factor greater '1' that leads to a better trade-off between higher attention area picture quality and lower attention area picture quality.

11. A non-transitory storage medium that contains or stores, or has recorded on it, a digital video signal encoded according to a method for adapting a default encoding of a digital video signal during a scene change period, which period includes at least one picture prior to the first picture of the new scene and at least one picture following said first picture of the new scene, wherein these pictures or macro pixel blocks or pixel blocks of these pictures are encoded in a predicted or in a non-predicted mode and wherein to quantized coefficients a number of bits are assigned for the further encoding processing, said method comprising:
- determining a scene cut and the corresponding scene change period;
- in each picture belonging to said scene change period, determining areas having at least two different human attention levels;
- assigning in pictures located prior to and at and after said scene cut to the areas having an attention level corresponding to lower attention less bits than in said default encoding, and assigning in the pictures located at and after said scene cut available bits saved in this way additionally to the areas having an attention level corresponding to higher attention,
- wherein said assigning of less bits to lower the attention areas is increased picture by picture until said first picture of the new scene, and is decreased picture by picture in the pictures following said first picture of the new scene, and wherein said assigning of more bits to the higher attention areas is decreased picture by picture starting from said first picture of the new scene.

* * * * *